(12) United States Patent  
Groppo (10) Patent No.: US 8,246,072 B2  
(45) Date of Patent: Aug. 21, 2012

(54) FOLDING FRAME PARTICULARLY FOR STROLLERS, PRAMS OR THE LIKE

(75) Inventor: Bruna Groppo, Sovizzo (IT)

(73) Assignee: L'Inglesina Baby S.p.A., Altavilla Vicentina (IT)

( * ) Notice: Subject to any disclaimer, the term of this patent is extended or adjusted under 35 U.S.C. 154(b) by 466 days.

(21) Appl. No.: 12/448,213

(22) PCT Filed: Dec. 27, 2007

(86) PCT No.: PCT/EP2007/064573  
§ 371 (c)(1),  
(2), (4) Date: Jun. 12, 2009

(87) PCT Pub. No.: WO2008/080942  
PCT Pub. Date: Jul. 10, 2008

(65) Prior Publication Data  
US 2010/0109291 A1  May 6, 2010

(30) Foreign Application Priority Data  
Jan. 4, 2007 (IT) .................................. VR07A0002

(51) Int. Cl.  
B62B 7/06 (2006.01)

(52) U.S. Cl. ...................................... 280/642; 280/648

(58) Field of Classification Search .................. 280/642, 280/643, 644, 647, 648, 649, 650, 658, 47.38, 280/47.41  
See application file for complete search history.

(56) References Cited

U.S. PATENT DOCUMENTS

| 4,256,325 | A | * | 3/1981 | Fleischer ....................... 280/649 |
| 4,428,598 | A | * | 1/1984 | Kassai ........................... 280/644 |
| RE31,760 | E | * | 12/1984 | Kassai ........................... 280/644 |
| 4,648,651 | A | * | 3/1987 | Hawkes ......................... 297/45 |
| 4,681,340 | A | * | 7/1987 | Pasquini ....................... 280/642 |
| 5,356,171 | A | * | 10/1994 | Schmidlin et al. ............ 280/650 |
| 5,490,685 | A | * | 2/1996 | Kitayama et al. .......... 280/47.38 |
| 5,938,230 | A | * | 8/1999 | Huang et al. .................. 280/650 |
| 6,113,128 | A | * | 9/2000 | Watkins ........................ 280/647 |
| 6,206,405 | B1 | * | 3/2001 | Watkins ........................ 280/647 |
| 6,322,097 | B1 | * | 11/2001 | Lan ............................... 280/642 |
| 6,811,178 | B2 | * | 11/2004 | Tomasi et al. ................. 280/650 |
| 7,478,825 | B2 | * | 1/2009 | Tomasi et al. ................. 280/642 |
| 7,571,926 | B2 | * | 8/2009 | Huang ........................... 280/647 |
| 7,717,457 | B2 | * | 5/2010 | Bearup et al. ................. 280/647 |
| 7,918,467 | B2 | * | 4/2011 | Cheng ............................ 280/38 |

(Continued)

FOREIGN PATENT DOCUMENTS

WO  WO 2006/114174 A  11/2006  
(Continued)

*Primary Examiner* — Hau Phan  
*Assistant Examiner* — Jacob Meyer  
(74) *Attorney, Agent, or Firm* — Modiano & Associati; Albert Josif; Daniel O'Byrne (57) ABSTRACT

A folding frame for strollers and prams, comprising a supporting framework which has two side members which are interconnected by an articulated structure, each side member having a rear upright (4b) and a front upright (4a) which are articulated to one another about an articulation assembly (4c) and are associated in a downward region respectively with a rear wheel assembly and a front wheel assembly, the side members having a respective handle tube (4e) which can move with a rotary and translational motion with respect to the respective front upright, the handle tubes being arranged laterally adjacent to the respective front upright.

13 Claims, 11 Drawing Sheets

U.S. PATENT DOCUMENTS

| | | | |
|---|---|---|---|
| 8,066,300 B2* | 11/2011 | Ohnishi | 280/647 |
| 2002/0113414 A1* | 8/2002 | Tomasi et al. | 280/650 |
| 2006/0145441 A1* | 7/2006 | Tomasi et al. | 280/47.371 |
| 2007/0262565 A1* | 11/2007 | Bearup et al. | 280/642 |
| 2009/0121454 A1* | 5/2009 | Tomasi et al. | 280/642 |

FOREIGN PATENT DOCUMENTS

WO    WO 2006/136921 A    12/2006

* cited by examiner

FOLDING FRAME PARTICULARLY FOR STROLLERS, PRAMS OR THE LIKE

The present invention relates to a folding frame particularly for strollers, prams or the like.

BACKGROUND OF THE INVENTION

As is known, frames for strollers and prams are currently widely used which can be folded so as to be able to pass from an extended (or open) condition, used to carry the child, to a collapsed (or closed) condition, in which the frame occupies less space and accordingly is easier to transport.

The most widely used folding frames include those commonly known as "umbrella-folding" due to the particular way in which they close.

Such frames for strollers or prams in fact fold both transversely and longitudinally (therefore along three dimensions) until they assume, in the collapsed condition, a shape which can be likened to the shape of a closed umbrella.

There are also frames which can fold with a so-called "flat-folding" closure and fold only longitudinally (along two dimensions).

In greater detail, a folding frame is constituted by a supporting framework which comprises two lateral side members, each of which is constituted by at least two uprights (front and rear ones), which support rotatably a wheel or a wheel assembly; the front uprights are further associated with a respective handle tube which supports, at one of its ends, a handgrip (or handle).

The front uprights and the rear uprights are articulated one another in order to allow the transition of the frame, as mentioned earlier, from the extended condition to the collapsed condition.

Usually, the handle tubes of one side member are connected to the rear uprights of the other side member by means of a crosspiece (commonly known as lower crosspiece) which, during use, is arranged below the structure adapted to accommodate the child to be carried.

As regards in particular umbrella-folding frames, the supporting framework has, between the two rear uprights, two pivoted parallelograms which are designed to allow the mutual approach and spacing, in a parallel manner, of the side members during transition from the extended condition to the collapsed condition and vice versa.

The folding frames, and particularly umbrella-folding ones, are very convenient to use, since they ensure a quick possibility to pass from the collapsed condition to the extended condition and vice versa and moreover occupy an extremely limited amount of space in the collapsed condition.

SUMMARY OF THE INVENTION

The aim of the present invention is to provide a folding frame for strollers, prams and the like which is easy to use and offers the greatest assurances of reliability and safety in operation.

Another object of the invention is to provide a folding frame which has high constructive simplicity and a low production cost, so as to make its use advantageous also from an economical standpoint.

This aim and these and other objects, which will become better apparent hereinafter, are achieved by a folding frame, particularly for strollers, prams and the like, according to what is stated in the appended claims.

BRIEF DESCRIPTION OF THE DRAWINGS

Further characteristics and advantages will become better apparent from the description of some preferred but not exclusive embodiments of the folding frame according to the invention, illustrated by way of non-limiting example in the accompanying drawings, wherein:

FIG. 11 is a perspective view of a portion of the rear uprights of a frame for strollers or the like;

FIG. 12 is another perspective view of a portion of the rear uprights of a frame for strollers or the like;

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

DESCRIPTION OF THE PREFERRED EMBODIMENTS

With reference to the figures, a folding frame, particularly for strollers, prams and the like, generally designated by the reference numeral 1, comprises a supporting framework 2 which has two side members 3.

The two side members 3 are interconnected by an articulated structure and each has a rear upright 4b and a front upright 4a.

The front uprights 4a and the rear uprights 4b are articulated one another (for example about an articulation assembly 4c) and are associated in a downward region respectively with a front wheel assembly 5a and a rear wheel assembly 5b.

In particular, each of the two side members 3 comprises a handle tube 4e, which, as explained in greater detail hereinafter, during transition from the open condition to the closed condition can move with a rotary and translational motion with respect to the respective front upright 4a.

Conveniently, in order to ensure a correct trajectory of the handle tube 4e with respect to the respective front upright 4a, there is a guiding rod 4d, which is connected rotatably to a respective articulation portion arranged substantially at the lower end portion of the handle tube 4e and of the front upright 4a.

Figure 1:
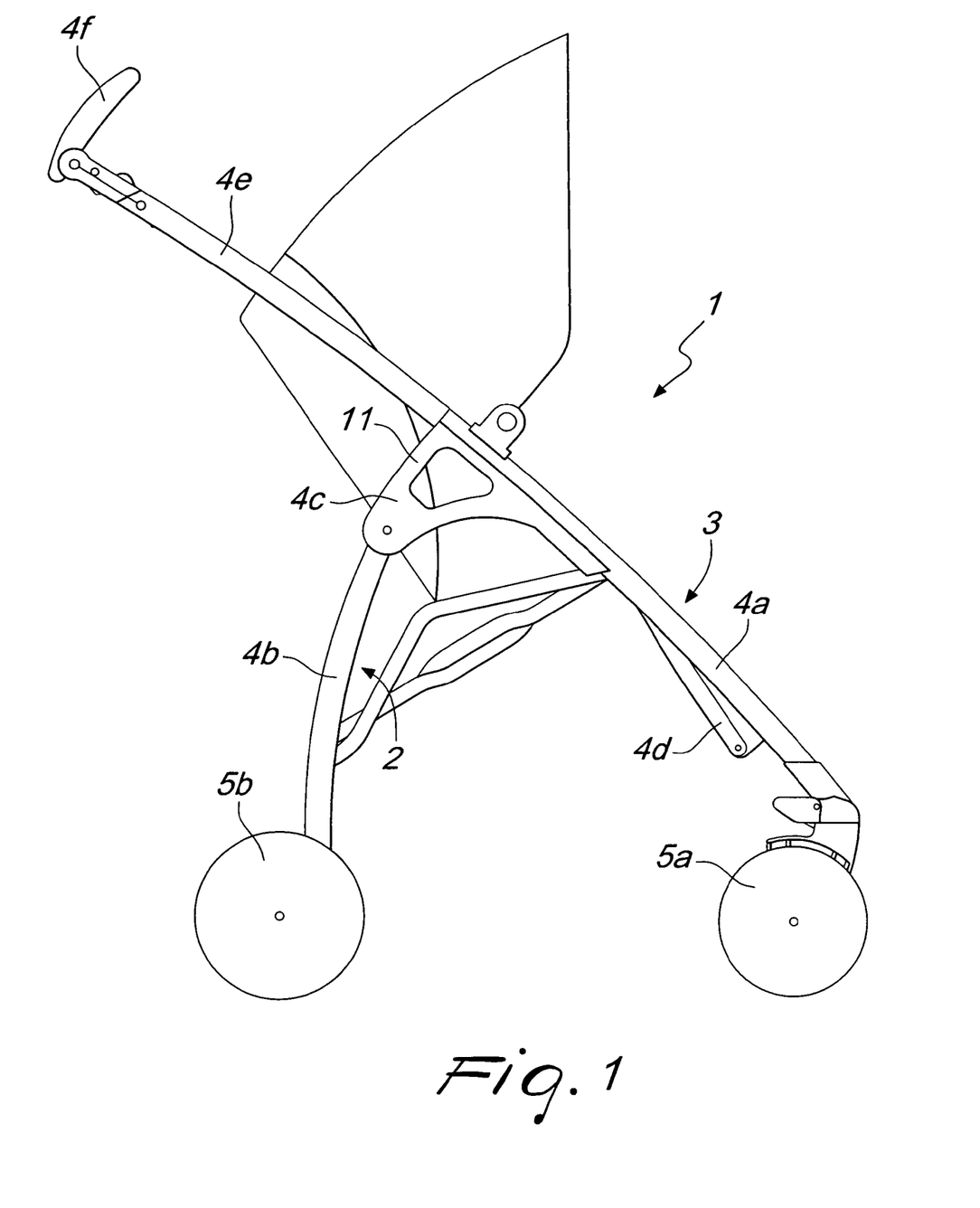
FIG. 1 is a side elevation view of a frame for strollers or the like in the extended condition.
Figure 2:
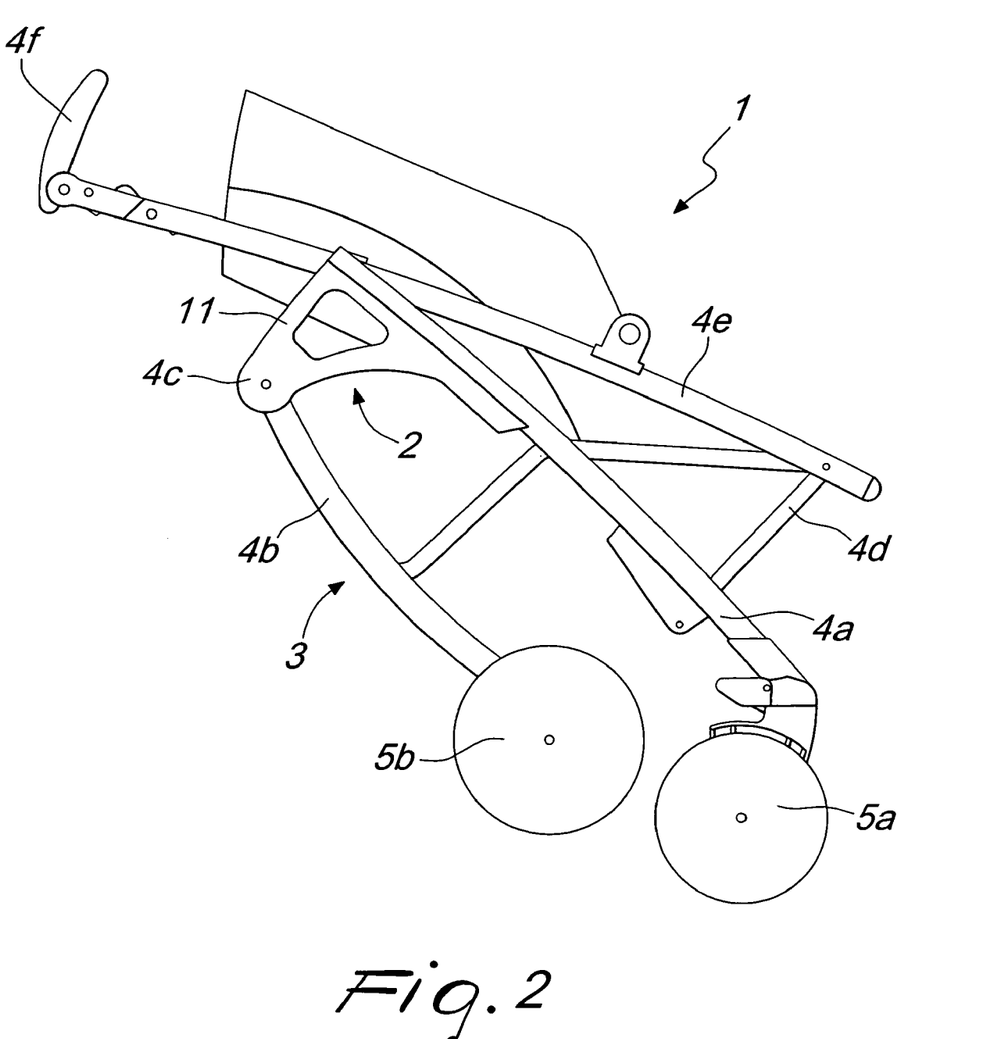
FIG. 2 is a view, similar to FIG. 1, but with the frame in an position which is intermediate between the extended condition and the collapsed condition.

In particular, as mentioned, the supporting framework 2 (and the folding frame 1 with it) is adapted to pass from an extended or open condition (shown in FIG. 1) to a collapsed or closed condition (shown in FIG. 2) and vice versa.

According to the present invention, the handle tube 4e has a portion which is arranged at least partially laterally adjacent to a portion of the front upright 4a.

In particular, it is evident that the mutually facing portions are, as regards the handle tube 4e, the end portion that lies opposite the handgrip 4f, and as regards the front upright, the end portion that lies opposite the one that supports the wheel assembly 5a.

It is evident that this solution allows to limit significantly the vertical space occupation of the assembly constituted by the front upright 4a and the handle tube 4e.

In conventional frames, the front uprights and the respective handle tubes are instead mutually superimposed, with an evident greater space occupation along the vertical direction.

Figure 3:
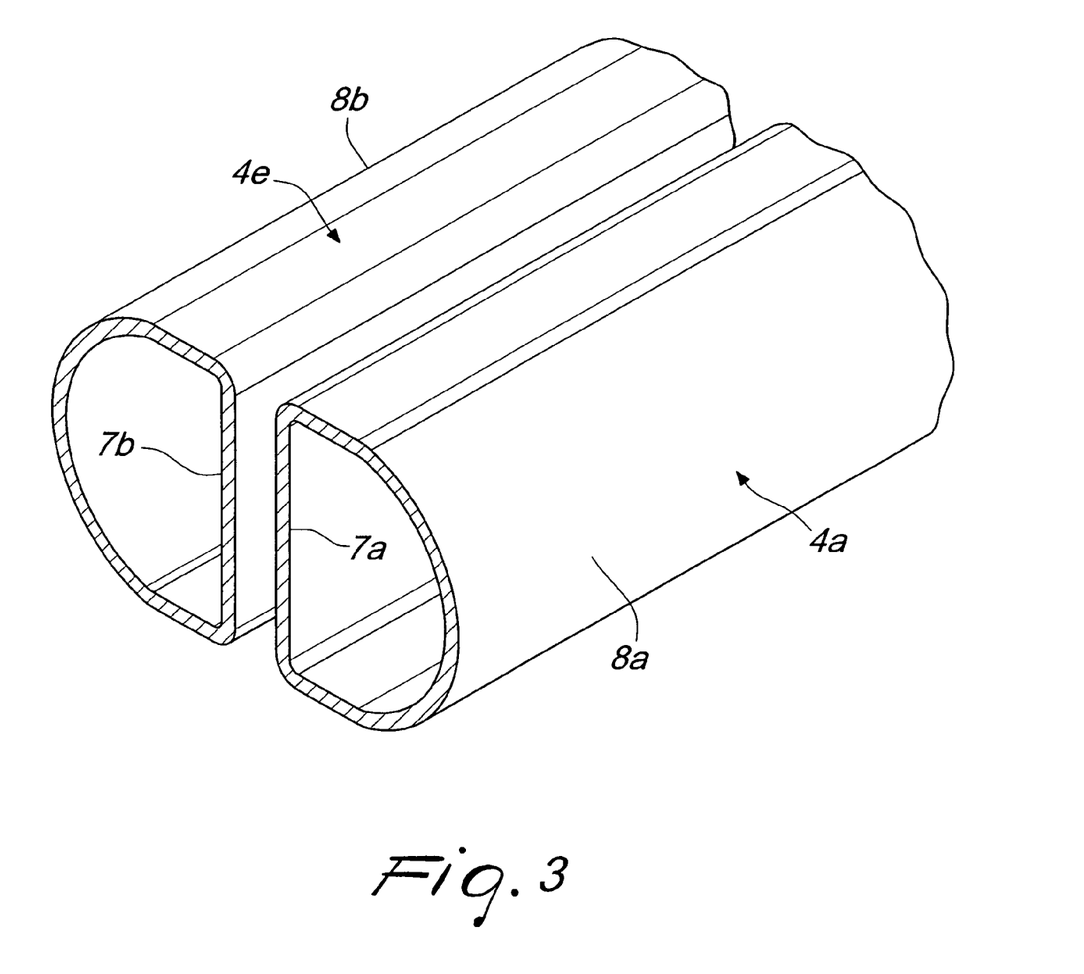
FIG. 3 is a sectional perspective view of a portion of a front upright arranged laterally adjacent to a respective handle tube.

Conveniently, as shown in the sectional views of FIGS. 4, 5, 6 and 15 and in the perspective view of FIG. 3, at least at the portions designed to be arranged side-by-side, the handle tube 4e and the front upright 4a both have a transverse cross-section which has a facing surface 7a and 7b and a blending surface 8a and 8b.

In particular, the facing surfaces 7a, 7b of each assembly constituted by a front upright 4a and a handle tube 4e are designed to be arranged mutually side by side, while the respective blending surfaces 8a, 8b are designed to cooperate with each other in order to provide, during mating, a substantially cylindrical and/or tubular structure.

It is evident that this feature can be used both in frames with umbrella-folding closure (of the type shown in the figures) and in frames with so-called flat-folding closure.

Figure 4:
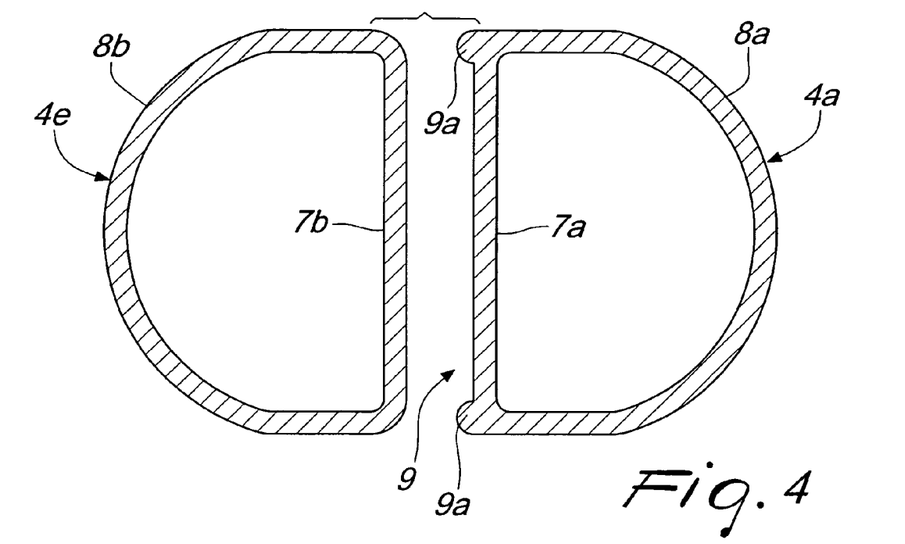
FIG. 4 is a transverse sectional view of the detail shown in FIG. 3.
Figures 5, 6:
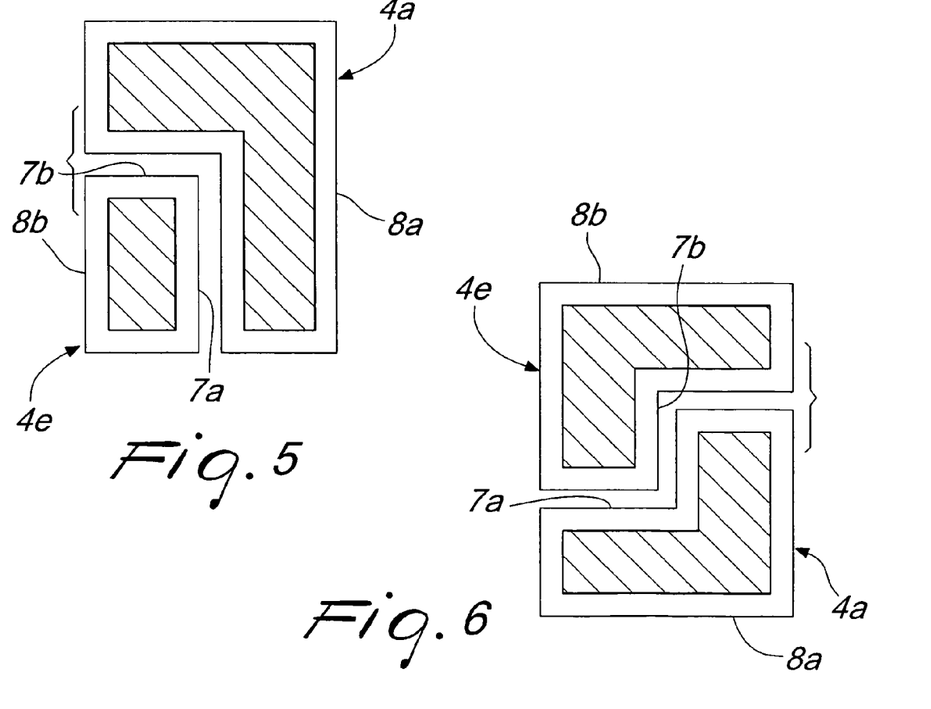
FIGS. 5 and 6 are sectional views, similar to FIG. 4, of constructive variations thereof related to the shape of the front upright and of the corresponding handle tube.
Figure 7:
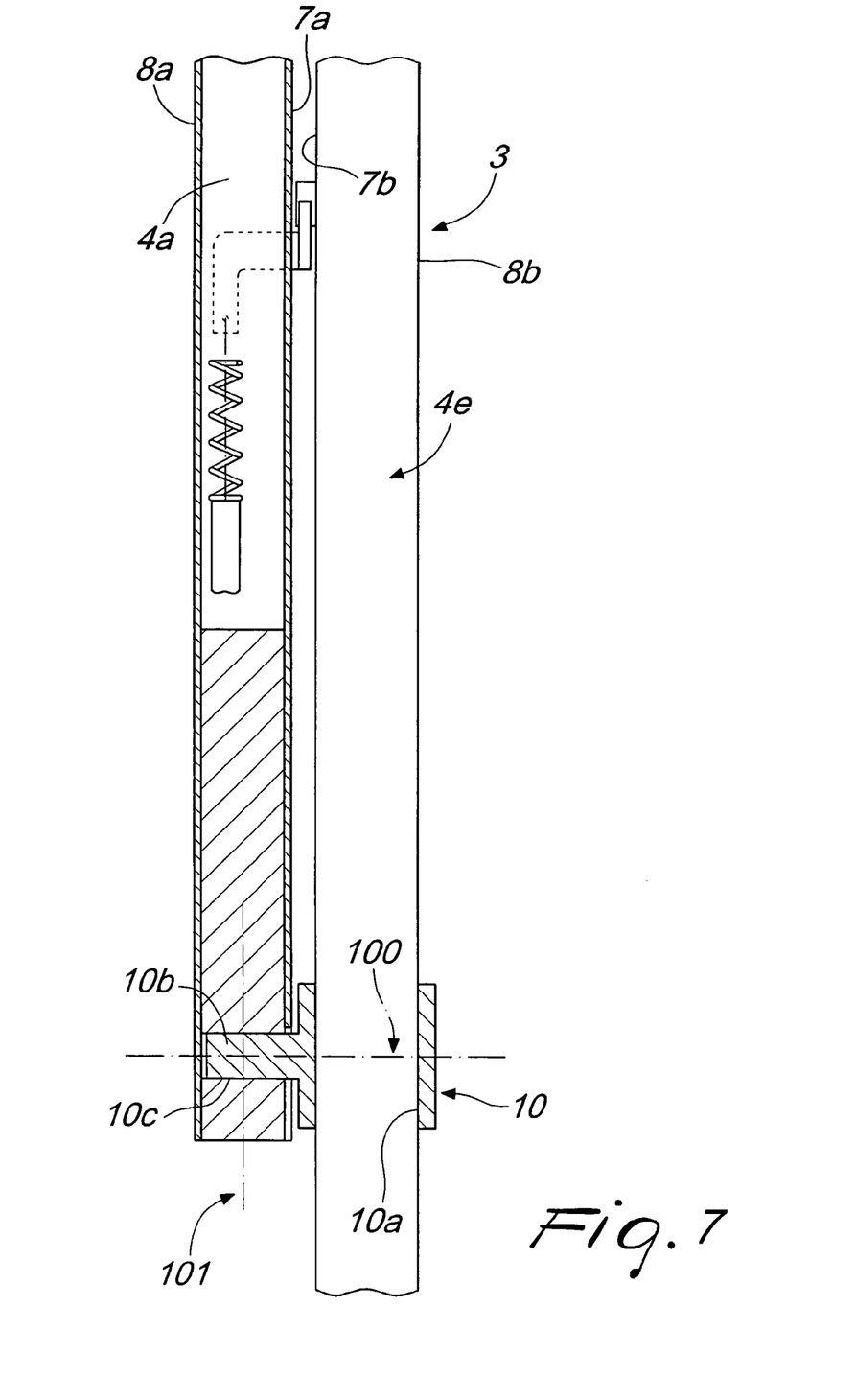
FIG. 7 is a partially sectional top view, taken along a longitudinal plane, of a portion of the front upright and of the handle tube, arranged at the articulation assembly.

The facing surfaces 7a and 7b may have various configurations and, in particular, may be monoplanar surfaces (as in the embodiments illustrated in FIGS. 4 and 15) or can be constituted by a plurality of planar surfaces, connected one another (as in the embodiments illustrated in FIGS. 5 and 6).

According to a further aspect of the present invention, with particular reference to the cross-section shown in FIG. 4, it is possible to provide spacer means 9 which act between the outer surface of the handle tube 4e and the articulation assembly 4c and/or the front upright 4a.

In practice, the spacer means 9, which for example can be constituted by one or more longitudinal ribs 9a, allow to prevent the optionally flat outer surface of the handle tube 4e from sliding with respect to the articulation assembly 4c or with respect to the surface of the front upright 4a which faces it, protecting the outer surface finish of the handle tube 4e.

As shown in the sectional view of FIG. 4, the longitudinal ribs 9a can be provided on the front upright 4a; however, nothing prevents the provision of the longitudinal ribs on the handle tube 4e or, if the handle tube 4e can move with a rotary and translational motion with respect to a guide carried by the articulation assembly 4c, their provision on such guide.

As shown in the sectional views of FIGS. 4, 5, 6 and 15 the facing surfaces 7a and 7b can have different shapes, but generally it is convenient for them to be mutually complementary, in order to ensure greater compactness of the assembly constituted by the front upright 4a and the handle tube 4e.

Advantageously, the handle tube 4e can be coupled slidingly to a sliding seat 10, which is fitted so that it can oscillate, about a first oscillation axis 100, on the frame 1.

In particular, the sliding seat 10 has a tubular element 10a, which is connected to a terminal 10b which is rotatably coupled to the articulation assembly 4c or to the front upright 4a.

With particular reference to the embodiment shown in the partially sectional view of FIG. 5, the terminal 10b is extended radially and more generally at right angles with respect to the direction of longitudinal extension 101 of the handle tube 4e and at right angles to the plane of arrangement of the side member 3.

In this regard, it has been found that, if the handle tube 4e is laterally adjacent to the front upright 4a, it is particularly advantageous for the terminal 10b to be able to rotate within a cylindrical seat 10c which is formed substantially at the end portion of the front upright 4a that lies opposite the wheel assembly 5a, conveniently at a central portion thereof.

In practice, in this case the rotary and translational motion of the handle tube 4e with respect to the front upright 4a (or with respect to the articulation assembly 4c) is achieved by means of the combination of a sliding movement of the handle tube 4e within the respective tubular element 10a and the simultaneous oscillation of the sliding seat 10 (which defines the cylindrical seat 10c) about the first oscillation axis 100.

Figure 8:
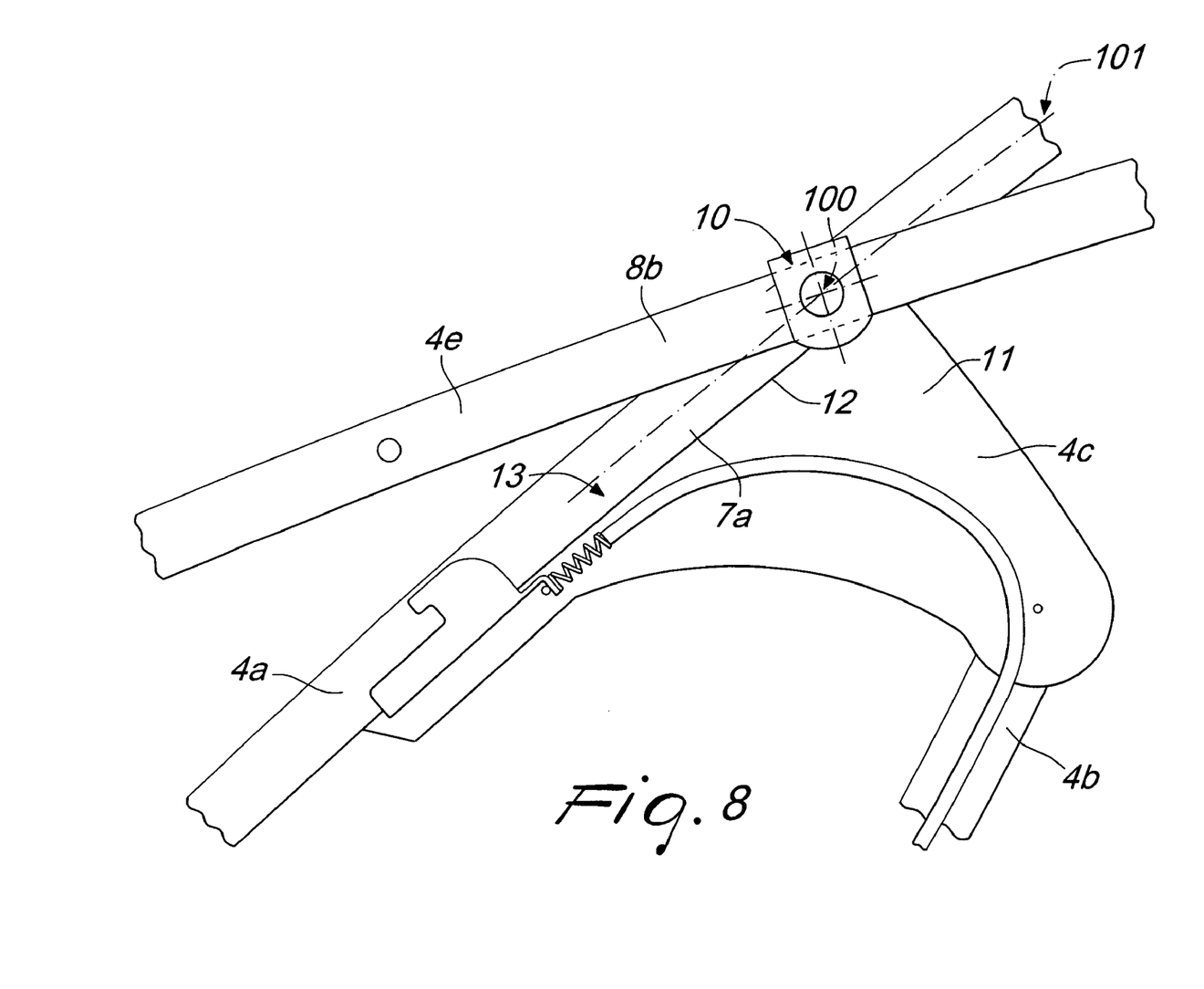
FIGS. 8 and 9 are enlarged-scale side elevation views of a portion of the frame at the articulation assembly, respectively in the intermediate position between the extended condition and the collapsed condition, and in the extended condition.
Figure 9:
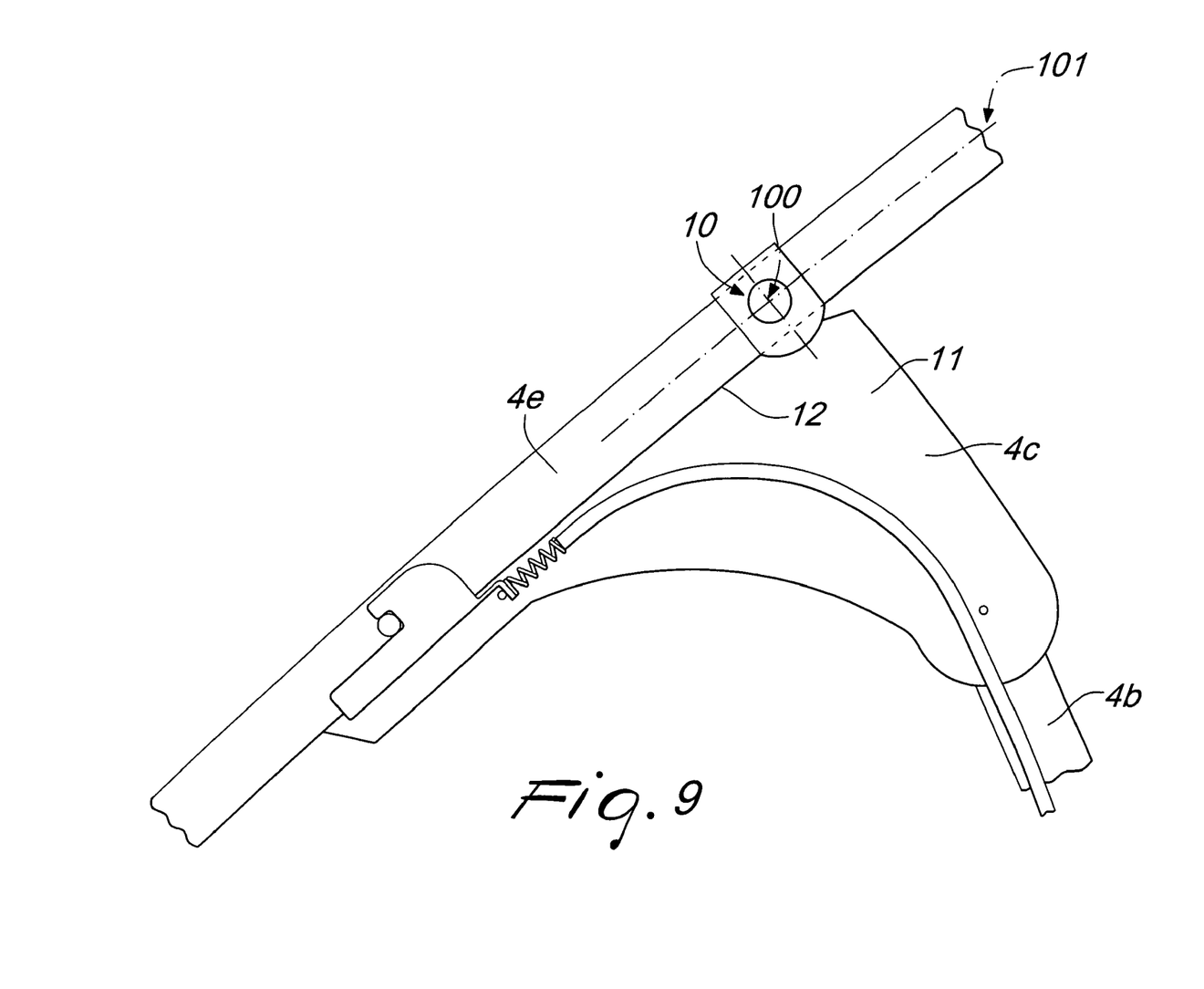
Figure 10:
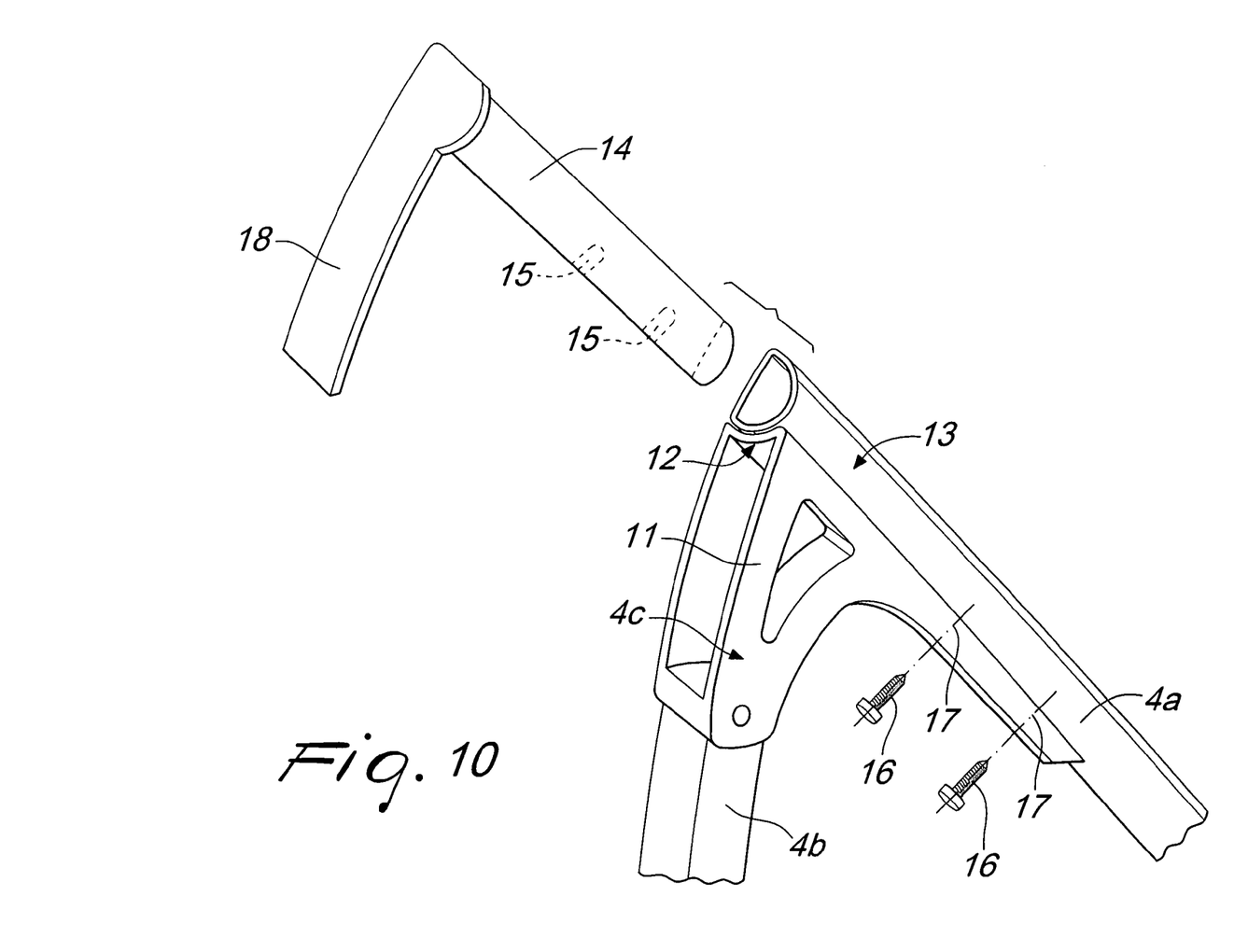
FIG. 10 is a partially exploded perspective view of the frame at the articulation assembly, in which the handle tube has been omitted for the sake of greater clarity.

With particular reference to what is shown in FIGS. 8 to 10, the articulation assembly 4c comprises a lower body 11, which is pivoted to the upper end of the rear upright 4b and is stably associated, at an abutment region 12, with an end portion 13 of the front upright 4a which is arranged on the opposite side with respect to the wheel assembly 5a.

Conveniently, the lower body 11 can be fixed at its abutment region 12 to the respective end portion 13 for example by inserting a tubular interconnection body 14, provided with threaded seats 15, within the end portion 13 and by subsequently mating screw elements 16 in the respective threaded seats 15 through openings 17 provided at the abutment region 12.

The tubular interconnection body 14 can be provided with a closure flap 18, which is also designed to cooperate with the lower body 11 to provide the articulation assembly 4c.

The articulation assembly 4c thus provided is far less bulky and at the same time easy and straightforward to assemble.

Nothing prevents from using a glue to connect the abutment region 12 to the end portion 13, there being a coupling surface that is sufficient to allow such type of connection.

In practice it has been found that the connection of the articulation assembly 4c to the lower surface of the front upright, differently from the conventional male/female coupling, allows to limit the bulk and keep the front upright and the respective handle tube effectively drawn close.

Figure 11:
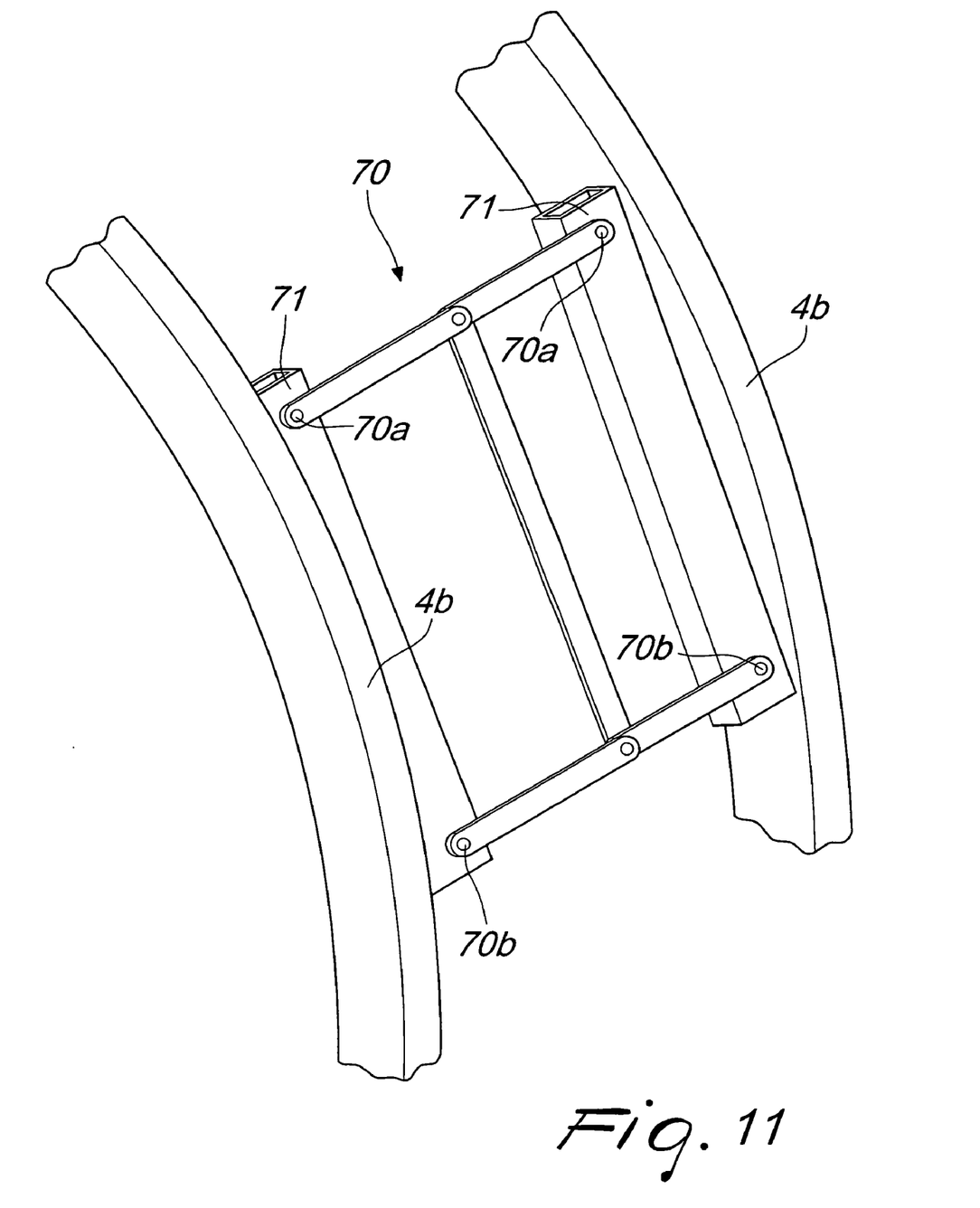

Conveniently, in order to allow an easier transport, as shown in FIG. 11, the frame 1 has rear uprights 4b which are curved so that their concavity is directed advantageously toward the front uprights 4a.

The two rear uprights 4b are interconnected by means of a double-parallelogram structure 70.

According to the invention, the rear uprights 4b are associated with a respective complementary upright 71, to which the upper ends 70a and the lower ends 70b of the double-parallelogram structure 70 are pivoted.

In particular, each of the complementary uprights 71 has two respective pivoting regions, which lie on the same plane of arrangement which is substantially perpendicular to the pivoting axes of the upper ends 70a and of the lower ends 70b of the double-parallelogram structure.

In practice, the plane of arrangement is substantially parallel to the plane within which the rods that provide the double-parallelogram structure 70 move.

This solution allows to ensure simply and effectively correct operation of the double-parallelogram structure 70, allowing the rods that compose it to always move on their own plane of arrangement during the transition of the frame 1 from the extended condition to the collapsed condition and vice versa.

Therefore, the presence of the complementary uprights 71 allows on one hand to curve at will the rear uprights 4b and on the other hand to avoid the need to act on the rear uprights 4b with an excessive number of holes which might compromise their aesthetic finish as well as their structural characteristics.

Figure 12:
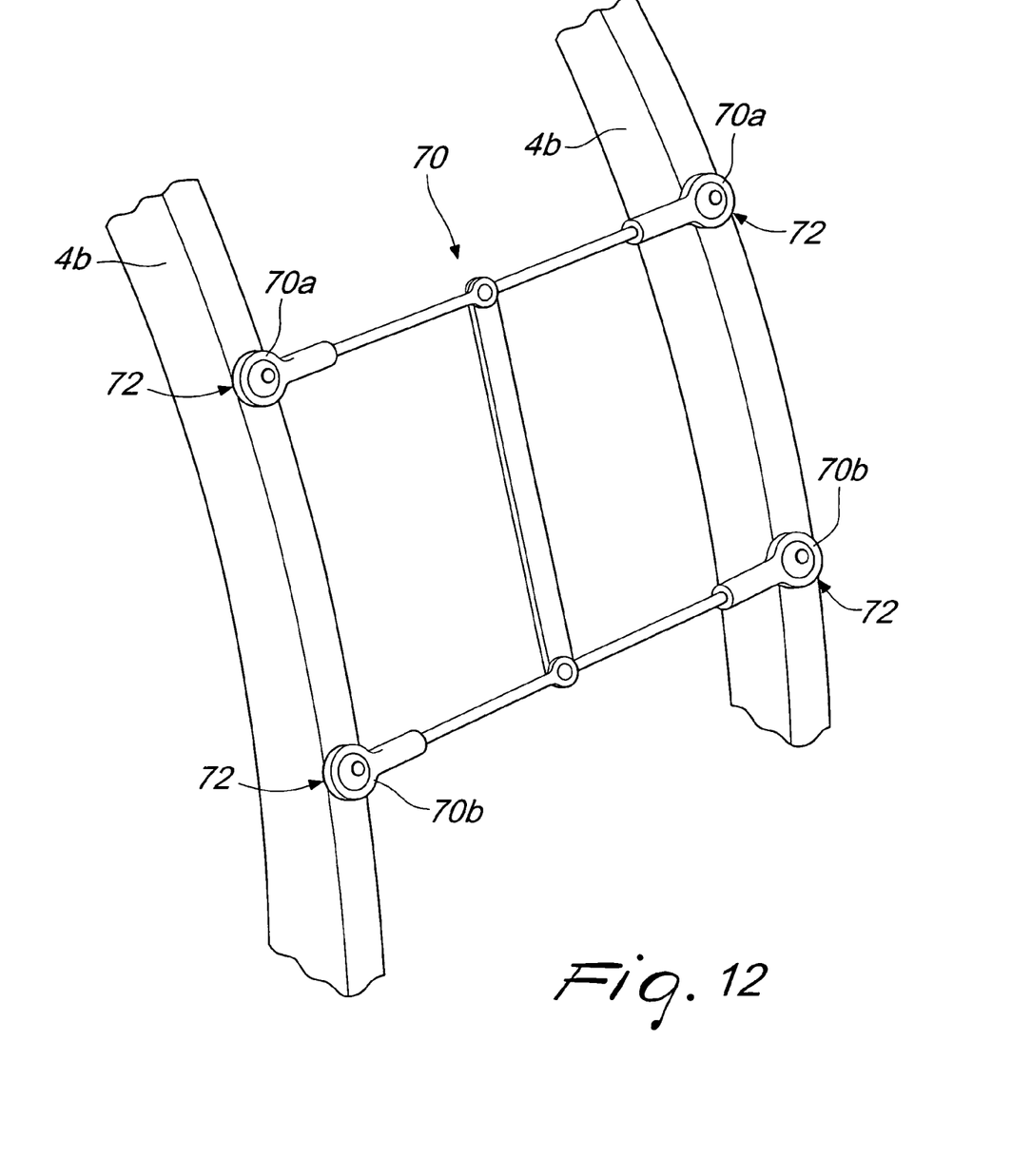
Figures 13, 14:
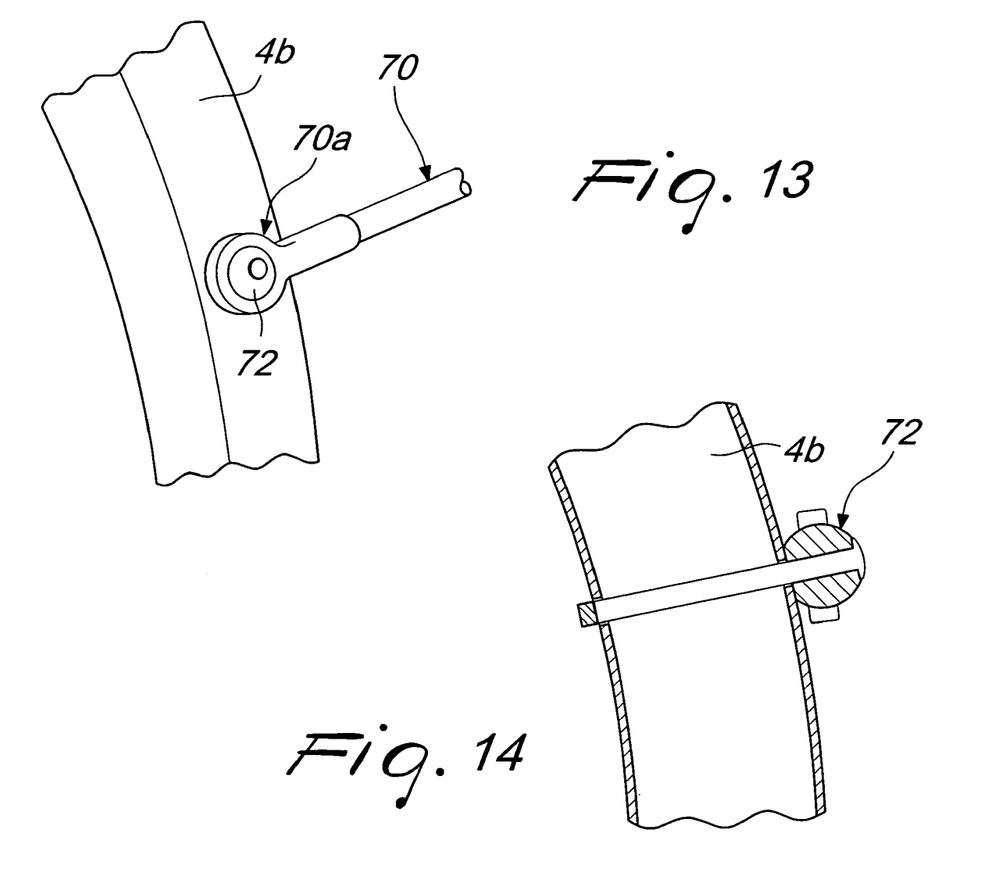
FIG. 13 is an enlarged-scale perspective view of a portion of a rear upright at the region for interconnection with the double-parallelogram structure.
FIG. 14 is a longitudinal sectional view of the rear upright, taken at the region for interconnection to the double-parallelogram structure.
Figure 15:
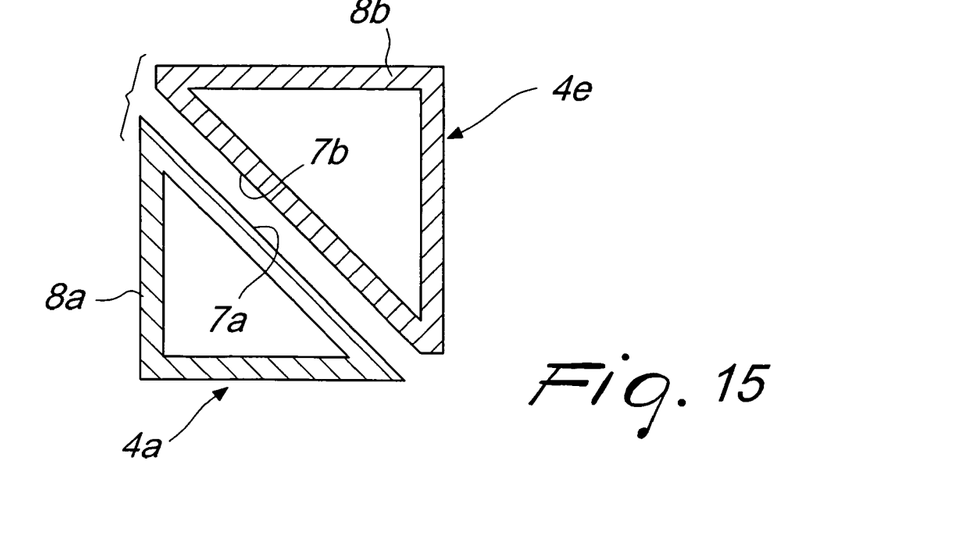
FIG. 15 is a sectional view similar to those of FIGS. 4-6.

As an alternative, as shown in FIGS. 12 to 14, the upper ends 70a and the lower ends 70b of the double-parallelogram structure 70 are associated with the respective rear uprights 4b (which in this case also are curved so that their concavity is directed toward the front uprights 4a) by way of the interposition of respective spherical hinges 72.

The solution proposed above substantially offers the same advantages as what was described earlier.

Operation of the folding frame according to the present invention can be deduced evidently from what has been described above.

All the features of the invention indicated above as advantageous, convenient or the like may also be omitted or be replaced with equivalents.

The invention thus conceived is susceptible of numerous modifications and variations, all of which are within the scope of the appended claims.

In practice it has been found that the invention has achieved its intended aim and objects in all of its embodiments.

In practice, the materials used, as well as the dimensions, may be any according to requirements.

All the details may further be replaced with other technically equivalent elements.

The disclosures in Italian Patent Application No. VR2007A000002 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A folding frame for strollers and prams, comprising a supporting framework which has two side members which are interconnected by an articulated structure, each side member having a rear upright and a front upright which are articulated to one another about an articulation assembly and are associated in a downward region respectively with a rear wheel assembly and a front wheel assembly, said side members having a respective handle tube which can move with a rotary and translational motion with respect to the respective front upright, said handle tubes having an end portion which is arranged laterally adjacent to an end portion of the respective front upright, said handle tube and said front upright each having a transverse cross-section, each said transverse cross-section having a facing surface and a blending surface, the respective facing surfaces being designed to be arranged mutually side-by-side and the blending surfaces being designed to mutually cooperate in order to provide, during coupling a substantially cylindrical and/or tubular structure.

2. The folding frame according to claim 1, further comprising spacer means which act between the outer surface of said handle tubes and said articulation assembly and/or said front upright.

3. The folding frame according to claim 2, wherein said spacer means act between said facing surfaces of said handle tube and of the respective front upright.

4. The folding frame according to claim 2, wherein said spacer means comprise at least one longitudinal rib which protrudes from the facing surface of said front upright.

5. The folding frame according to claim 2, wherein said spacer means comprise at least one longitudinal rib which protrudes from the facing surface of said handle tube.

6. The folding frame according to claim 2, wherein said handle tube is slidingly coupled to a sliding seat which is fitted so that it can oscillate on said frame about a first oscillation axis.

7. The folding frame according to claim 6, wherein said sliding seat has a tubular element which is connected to a terminal which is rotatably coupled to said articulation assembly or to said front upright.

8. The folding frame according to claim 6, wherein said sliding seat has an oscillation axis which passes through the longitudinal axis of the respective front upright.

9. The folding frame according to claim 1, wherein said articulation assembly comprises a lower body which is pivoted to the upper end of a respective rear upright and is stably associated, at an abutment region, with said end portion of said front upright opposite an end of said front upright having the wheel assembly.

10. The folding frame according to claim 9, wherein said abutment region is arranged below said end portion of said front upright.

11. The folding frame according to claim 1, further comprising a tubular interconnection body which can be inserted within said end portion of said front upright, coupling means being provided which are adapted to stably connect said tubular interconnection body to said lower body.

12. The folding frame according to claim 1, wherein said rear uprights are curved so that their concavity is directed toward said front uprights and are interconnected by means of a double-parallelogram structure, said rear uprights being associated with a respective complementary upright, to which the upper and lower ends of said double-parallelogram structure are pivoted.

13. The folding frame according to claim 1, wherein said rear uprights are curved so that their concavity is directed toward said front uprights and are interconnected by means of a double-parallelogram structure, the upper and lower ends of said double-parallelogram structure being associated with the respective rear uprights by way of the interposition of respective spherical hinges.

* * * * *